(12) United States Patent
White

(10) Patent No.: US 7,309,400 B2
(45) Date of Patent: Dec. 18, 2007

(54) METHODS OF IMPROVING UNIFORMITY IN ADDITIVE MANUFACTURING PROCESSES

(75) Inventor: Dawn White, Ann Arbor, MI (US)

(73) Assignee: Solidica, Inc., Ann Arbor, MI (US)

( * ) Notice: Subject to any disclaimer, the term of this patent is extended or adjusted under 35 U.S.C. 154(b) by 585 days.

(21) Appl. No.: 10/393,148

(22) Filed: Mar. 20, 2003

(65) Prior Publication Data

US 2003/0178137 A1    Sep. 25, 2003

Related U.S. Application Data

(60) Provisional application No. 60/365,950, filed on Mar. 20, 2002.

(51) Int. Cl.
*B32B 37/00* (2006.01)
(52) U.S. Cl. ............... 156/308.2; 156/73.1; 228/110.1; 228/228
(58) Field of Classification Search ............. 156/308.2, 156/73.1; 228/110.1, 228
See application file for complete search history.

(56) References Cited

U.S. PATENT DOCUMENTS 6,450,393 B1 *    9/2002    Doumanidis et al. ..... 228/110.1

* cited by examiner

*Primary Examiner*—John L Goff
(74) *Attorney, Agent, or Firm*—Gifford, Krass, Sprinkle, Anderson & Citkowski, PC

(57) ABSTRACT

This invention improves upon existing approaches by providing a method for improving the uniformity of additive manufacturing processes of the type wherein material increments are consolidated to produce a three-dimensional object. According to one aspect of the invention, the method comprises the steps of tacking an increment during the method to minimize creep, then fully consolidating that increment to the underlying material. According to a different aspect of the invention, the method includes a step of steering the welding head or the feeding of the increments to ensure that the relative orientation of the contact line of the welding head as defined by the lowest surface is parallel to the central axis. As yet a further aspect of the invention, a different method includes a step of placing the increment so as to minimize the ratio of deformed to undeformed material. Such placement may be carried out manually over automatically.

3 Claims, 1 Drawing Sheet

METHODS OF IMPROVING UNIFORMITY IN ADDITIVE MANUFACTURING PROCESSES

REFERENCE TO RELATED APPLICATION

This application claims priority from U.S. Provisional Patent Application Ser. No. 60/365,950, filed Mar. 20, 2002, the entire content of which is incorporated herein by reference.

FIELD OF THE INVENTION

This invention relates generally to additive manufacturing processes, and, in particular, to systems and methods for improving the uniformity of such processes.

BACKGROUND OF THE INVENTION

In additive manufacturing or rapid prototyping, arbitrary shapes are created, usually by layering. In the layering process, cross sections are generated, and covered with a feedstock, which is bonded to the preceding layers. As this operation is performed repetitively, the object geometry is produced.

Many layered manufacturing processes such as stereolithography, laser engineered net shaping and selective laser sintering employ little or no pressure during bond formation. Instead, they employ liquid wetting and liquid-solid phase transformations as the means of producing joining between previously built materials and added layers. These methods have certain engineering drawbacks when attempting to build structures using high melting point materials such as metals. Solid state bonding methods exist for layered manufacturing, but typically involve the use of modest amounts of pressure. Examples include ultrasonic welding, resistance welding and friction joining. During bonding, this pressure may result in deformation in the material subjected to the process.

As each cross section of the object is fabricated, the total area or shape may change. As a result, unless the feedstock employed has an infinitely small dimensions in X, Y, and Z, the potential exists for mismatch between the edges of the desired part cross section and the coverage of the feedstock. In most rapid prototyping processes, this results in the well known "stair stepping" of the surface; i.e., the feedstock does not perfectly match the contours of the part geometry.

One method for eliminating this stair stepping is to trim the part following addition of feedstock material. Correctly implemented, this can result in smooth part surfaces that exactly match part design intent. It also expands the range of feedstock geometries which are reasonable, to include much wider tape, strip or sheet formats. The wider the feedstock, the higher productivity can be, as less process time is consumed by material feeding, traveling over the part cross section and bonding of layers.

However, as the feedstock dimensions increases from wire, to tape to sheet format, the amount of material to be trimmed increases as well. If deformation of the feedstock occurs during bonding of material increments to previously deposited layers, this may result in relatively large ratios of bonded, i.e., deformed material, to unbonded, i.e., undeformed material for certain cross section geometries. This situation is illustrated in FIG. 1. Outlines of feedstock material are shown at 102, and the outline of a cross-section to be covered is shown at 104. Zones 106 are where high ratios of undeformed material exists. Item 108 is a tape-type feedstock covering the cross-section.

The result of this situation is that a residual stress is produced in the deformed material which must be balanced by forces from the undeformed material. As a result there will be a tendency for movement of the tapes or sheet which are applied. Buckling of the material at the deformed-undeformed interface may also occur. This can cause non-uniform build through gaps between tapes, or deviations in surface height cause by the buckling of the material.

SUMMARY OF THE INVENTION

This invention improves upon existing approaches by providing a method for improving the uniformity of additive manufacturing processes of the type wherein material increments are consolidated to produce a three-dimensional object.

According to one aspect of the invention, the method comprises the steps of tacking an increment during the method to minimize creep, then fully consolidating that increment to the underlying material. According to a different aspect of the invention, the method includes a step of steering the welding head or the feeding of the increments to ensure that the relative orientation of the contact line of the welding head as defined by the lowest surface is parallel to the central axis.

As yet a further aspect of the invention, a different method includes a step of placing the increment so as to minimize the ratio of deformed to undeformed material. Such placement may be carried out manually over automatically.

DETAILED DESCRIPTION OF THE INVENTION

Figure 1:
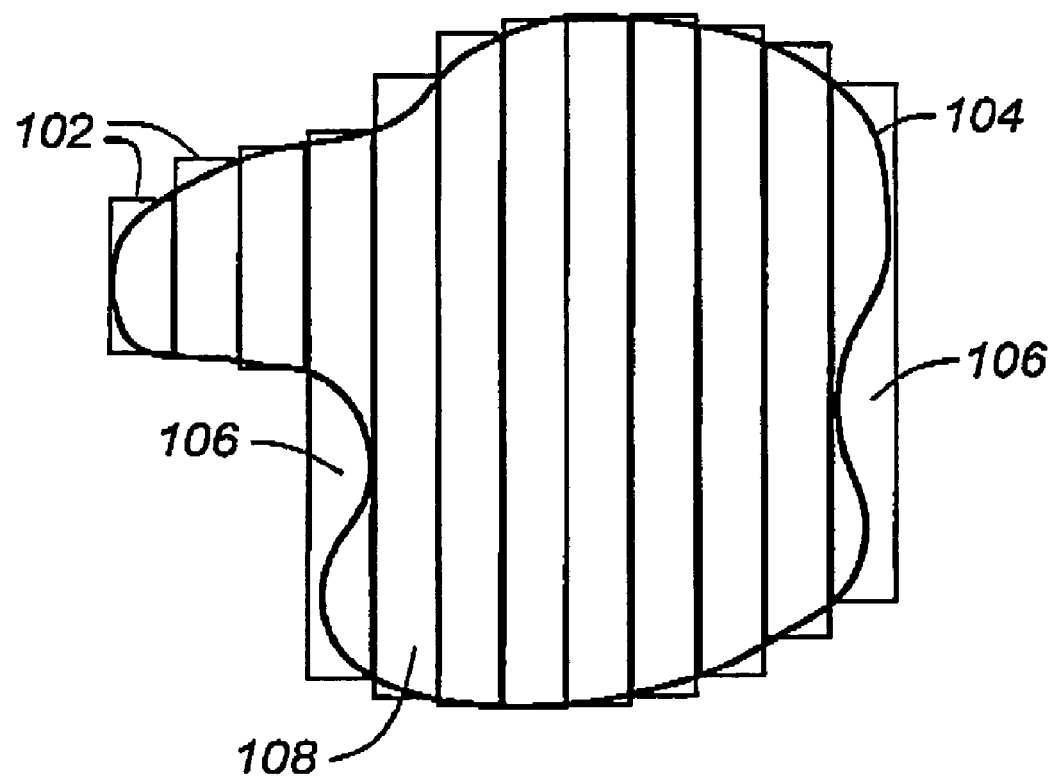
FIG. 1 is a diagram illustrating a laminated structure of the type to which the present invention may be directed.

Broadly, this invention resides in techniques for making additive manufacturing processes employing pressure work well in practice by compensating for non-uniform deformation of feedstock. The techniques are applicable to bonding between layers in a layered manufacturing process based upon ultrasonic welding, resistance welding or other processes which involve pressure, either static or with rolling contact.

EXAMPLES

Tack Then Weld

One technique according to the invention is to "tack" or partially weld down the feed material, without fully deforming it. This tack pass constrains the material with respect to location as it is deposited, but is carried out using joining parameters that are not sufficient to produce bulk deformation so that movement or buckling does not occur. This tack is followed by a higher powered welding pass, in which complete bonding is effected. Because of the prior tack, the material cannot move during the weld pass, in spite of the deformation which occurs.

Steering of Tape or Horn

An alternative is to employ active steering of the welding head or the feeding of the material, to ensure that the relative orientation of the contact line of the horn as defined by the lowest surface that is parallel to the central axis. In the preferred embodiment, the relationship is parallel to the build surface within 0.01 mm per 25 mm. Steering can be effected by the motion of the contact line about an axis orthogonal to and central to the contact line in the direction of welding such that the side of the of the contacting zone experiencing the highest forces causes material extrusion relative to the side with lower forces. This differential material extrusion causes an excess extrusion of material on the side experiencing higher forces such that the fed-forward tape deforms away from the high force side. By sensing the direction of the motion of the fed-forward tape, the contact line can be corrected in a closed loop fashion, employing motors and electronic controls using methods well known to those experienced in machine design and construction. This can be used to counteract the effect of the non-uniform deformation and its tendency to cause the tape to move.

An alternative to differentially loading the sonotrode across the contact line, is the addition of a yaw or rotary axis either for the sonotrode, or the bed on which the part is being constructed. This will have the effect of steering the tape parallel to the contact line, which is rotated via the yaw axis, and can counteract the effect of the non-uniform deformation and its tendency to cause the feedstock to move.

Feedstock Motion/lay Up

Careful selection of the placement of the feedstock can also assist in minimizing the tendency of the material to move or for buckling to occur. This can be a manual operation performed by a system user, or a computer algorithm can be developed which minimizes the ratio of deformed to undeformed material. For example, if a tape feedstock is used, intersections of tapes with the cross section can be examined either manually or automatically, and the tape application shuffled horizontally to minimize the number of problem areas. For a sheet feedstock a similar operation can be employed.

I claim:

1. In an additive manufacturing process of the type wherein material increments are consolidated to produce a three-dimensional object, a method of improving the uniformity of the consolidated increments, comprising the steps of:
    (a) providing a feedstock in the form of a tape or sheet;
    (b) tacking the feedstock to underlying material using joining parameters that are not sufficient to produce bulk deformation;
    (c) using a separate welding pass under pressure after tacking, and at a power level higher than that used for tacking, to fully consolidate the feedstock; and
    (d) repeating steps (a) through (c) to produce the three-dimensional object.

2. The method of claim 1, wherein the welding pass uses ultrasonic energy.

3. The method of claim 2, wherein the ultrasonic energy is applied under rolling pressure.

* * * * *